United States Patent [19]

Smeets

[11] 4,271,671

[45] Jun. 9, 1981

[54] TWO STEP PRESSURE INTENSIFIER SYSTEM

[76] Inventor: Gerard G. F. Smeets, 50 Inverlochy Blvd., Apt. 102, Thornhill, Ontario, Canada

[21] Appl. No.: 84,184

[22] Filed: Sep. 5, 1979

Related U.S. Application Data

[63] Continuation of Ser. No. 777,965, Mar. 16, 1977, abandoned.

[30] Foreign Application Priority Data

May 17, 1976 [CA] Canada .................................. 252689

[51] Int. Cl.[3] .............................................. B60T 11/08

[52] U.S. Cl. ....................................... 60/578; 60/593; 60/589

[58] Field of Search ....................... 60/547 R, 574, 578, 60/588, 591, 592, 593, 581, 589; 91/417; 92/8, 10, 143

[56] References Cited

U.S. PATENT DOCUMENTS

| | | | |
|---|---|---|---|
| 2,021,463 | 11/1935 | Peters | 60/581 |
| 2,689,074 | 9/1954 | Price | 60/588 |
| 2,816,422 | 12/1957 | Fletcher | 60/578 |
| 3,059,433 | 10/1962 | Hirsch | 60/54.5 |
| 3,266,415 | 8/1966 | Palmer | 60/593 |
| 3,306,678 | 2/1967 | Lepelletier | 60/581 |
| 3,633,365 | 1/1972 | Belknap | 60/578 |
| 3,787,147 | 1/1974 | McClocklin | 60/578 |
| 3,929,057 | 12/1975 | Kondo | 92/10 |
| 4,051,877 | 10/1977 | Fletcher | 60/574 |

FOREIGN PATENT DOCUMENTS

| | | | |
|---|---|---|---|
| 2017007 | 10/1971 | Fed. Rep. of Germany | 60/593 |
| 178613 | 3/1962 | Sweden | 60/574 |
| 532980 | 2/1941 | United Kingdom . | |
| 944631 | 12/1963 | United Kingdom | 92/10 |
| 1013035 | 12/1965 | United Kingdom . | |
| 1016293 | 1/1966 | United Kingdom . | |
| 1144373 | 3/1969 | United Kingdom . | |
| 1184531 | 3/1970 | United Kingdom . | |
| 1294496 | 10/1972 | United Kingdom . | |
| 1441977 | 7/1976 | United Kingdom . | |

*Primary Examiner*—Abraham Hershkovitz

[57] ABSTRACT

A two step pressure intensifier system consisting of three piston-cylinder units in coaxial arrangement, the first unit being a low pressure medium supplied to it to jointly move the pistons of all the units. The initial movement employing the second unit for a moderate pressure increase and the final movement bringing the piston of the third unit into its cylinder for a high pressure increase.

4 Claims, 2 Drawing Figures

TWO STEP PRESSURE INTENSIFIER SYSTEM

BACKGROUND OF INVENTION

This invention relates to a pressure intensifier system incorporating two stages of pressure intensification and is especially adaptable for use with hydraulically powered machine tools such as punch presses.

Pressure intensifier systems are known and generally utilize a low air pressure source of, for instance 100 lbs per square inch, which is applied to the pressure intensifier system to produce an intensified pressure output. The pressure medium used in the output is usually oil.

The known systems have drawbacks in that they are generally cumbersome and not readily adaptable for portable use. A further disadvantage is that a high pressure is supplied over a long distance of ram operation in order to first compress the stripper spring of a punch press and then carry out the actual punching operation. It will be obvious that a low pressure could be utilized for spring compression and a higher pressure for final punching action.

It is accordingly an object of the present invention to provide a pressure intensifier system in which pressure is available in two steps—a low pressure for initial movement and a high pressure when required for the actual punching operation.

It is also an object to provide a two-step pressure intensifier system which is compact and readily portable.

SUMMARY OF THE INVENTION

In accordance with the present invention, low pressure is supplied to a first piston-cylinder unit of which the piston is connected to a further piston in a second piston-cylinder unit wherein there is a leakge or flow-by allowed which acts as a pressure release during the initial movement of the piston in the cylinder of the second unit. After a pre-determined movement a third piston-cylinder unit, of small working area with respect to the first piston-cylinder unit, becomes active to supply the final high pressure step. For compactness and economical construction the piston-cylinder arrangements are coaxial and the pistons mechanically linked.

BRIEF DESCRIPTION OF THE DRAWINGS

For a better understanding of the construction and operation of the invention, reference will now be made to the drawings in which.

DESCRIPTION OF THE PREFERRED EMBODIMENT

Figure 1:
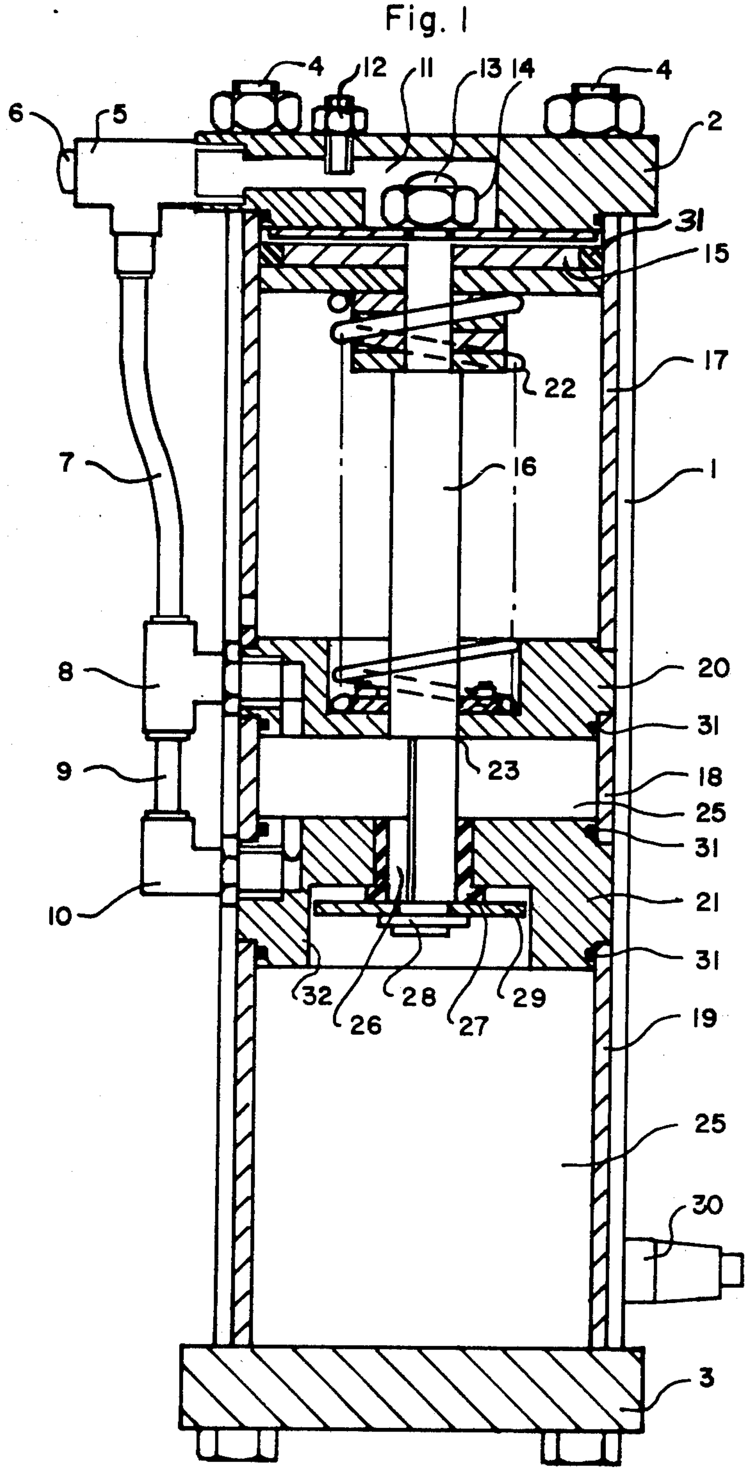
FIG. 1 shows a two-step pressure intensifier system adapted for portable uses and, FIG. 2 shows a two-step pressure-intensifier system similar to that of FIG. 1 with a ram-piston arrangement combined therewith in a unitary structure. Parts similar to that of FIG. 1 are similarly designated.

Referring now to FIG. 1, the pressure intensifier comprises a main cylinder member 1 closed at opposite ends by a top plate 2 and bottom plate 3. The end plates 2, 3 are held in position by a plurality of long bolts 4 extending outside the cylinder 1.

Top plate 2 is provided with fluid (air) pressure inlet connection fitting 5 connected to a low pressure fluid source (not shown) by means of a conduit 6. A further pipe 7 connects pressure from the source to inlet connector 8, conduit 9 and inlet connector 10 and will be referred to subsequently. Plate 2 is also provided with a cavity 11 which is in communication with inlet connector 5. The cavity 11 further accommodates a shaft end 13 and a nut 14 which are used to secure a piston unit 15 on a piston rod 16. Cylinder partition members 20 and 21, to be described more fully hereinafter, are held in fixed position in cylinder 1 by spacer liners 17, 18, and 19, the partition members and liners being clamped between end plates 2 and 3.

A spring 22, surrounding rod 16, located between partition 20 and piston 15 urges the piston to its uppermost position as shown in FIG. 1.

Partition member 20 is provided with a central bore 23 accommodating rod 16 and is a close fit thereon to provide a leak proof seal. Inlet connection 8 is in communication with the space between partitions 20 and 21 through a duct provided in partition 20. Further inlet connection 10 is in communication with the same space and tube 9 is preferably of glass so that the level of oil 25 may be readily determined. Oil is contained in the spaces between partition 21 and end plate 3 and is employed as the high pressure medium as will presently be described. The low pressure is, of course, present in the space between partitions 20 and 21. Seals 31 are used when necessary.

Rod 16, at its lower end, is of reduced cross-section while a central bore 26, in partition 21, is provided with a seal 27 which closely fits the larger cross-section area of Rod 16. Shaft 16 is provided at its lower extremity with a pistonplate 29 loosely accommodated in an enlarged central bore 32 on the lower side of partition 21. Plate 29 may be secured to Rod 16 by a snap washer 28 as shown.

The lower space of the system enclosed between partition 21 and end plate 3, is filled with oil as stated previously. A high pressure outlet connector 30 is provided for tapping the high pressure oil for useful work such as sheet metal punching. Seals 31 are provided encircling the partitions to prevent pressure leaks between enclosed spaces.

OPERATION OF THE INVENTION

In operation of the system of FIG. 1, a low pressure source is connected to inlet conduit 6 and pressure is applied to the upper surface of piston 15 and also to the space between partitions 20 and 21. Piston 15 is moved downward by the applied pressure and this movement is resisted by spring 22 as well as the pressure on piston 29 which pressure is relieved somewhat by flow-by of oil 25 around the outside of loose fitting piston 29. As piston 29 moves downward, during the initial part of the working stroke, oil 25 is drawn from the space between partitions 20, 21 through bore 26 and past the reduced cross-section of shaft 16 into the space being created above piston 29. Piston 29 acts as a retardant for the downward movement of Rod 16, dependent on the allowed flow-by and will apply a pressure to the oil 25 largely determined by the relative active areas of pistons 15 and 29. A ratio of 4 in area will provide a step-up at outlet 30 of oil pressure at approximately 4 times that of the low pressure source. Retardation time can be adjusted by the amount of flow-by allowed.

When the larger part of rod 16 enters seal 27 a new pressure relationship is established whereat the pressure of oil 25 in the lower-most space is rapidly increased to a value determined by the relative active areas of piston 15 and rod 16. If, for instance, the active area of piston 15 is 20 square inches and the cross-sectional area of shaft 16 is 1 square inch then the final pressure of the oil at outlet 30 is 20 times the applied pressure, i.e. 2000 lbs, per sq. inch for a low pressure source value of 100 lbs per sq. inch.

It will now be obvious that a two-step pressure source is provided in that during the initial portion of the stroke of piston 15 and rod 16 a low pressure, for instance 400 lbs. per square inch, is provided and during the later portion a high pressure (2000 lbs. per square inch) is provided. The initial lower pressure may be used for stripper spring compression, which action may require considerable movement of piston 15 to supply the volume of oil necessary, whereas the high pressure oil volume required for a punching operation is generally considerably less and readily supplied by the higher pressure system.

Figure 2:
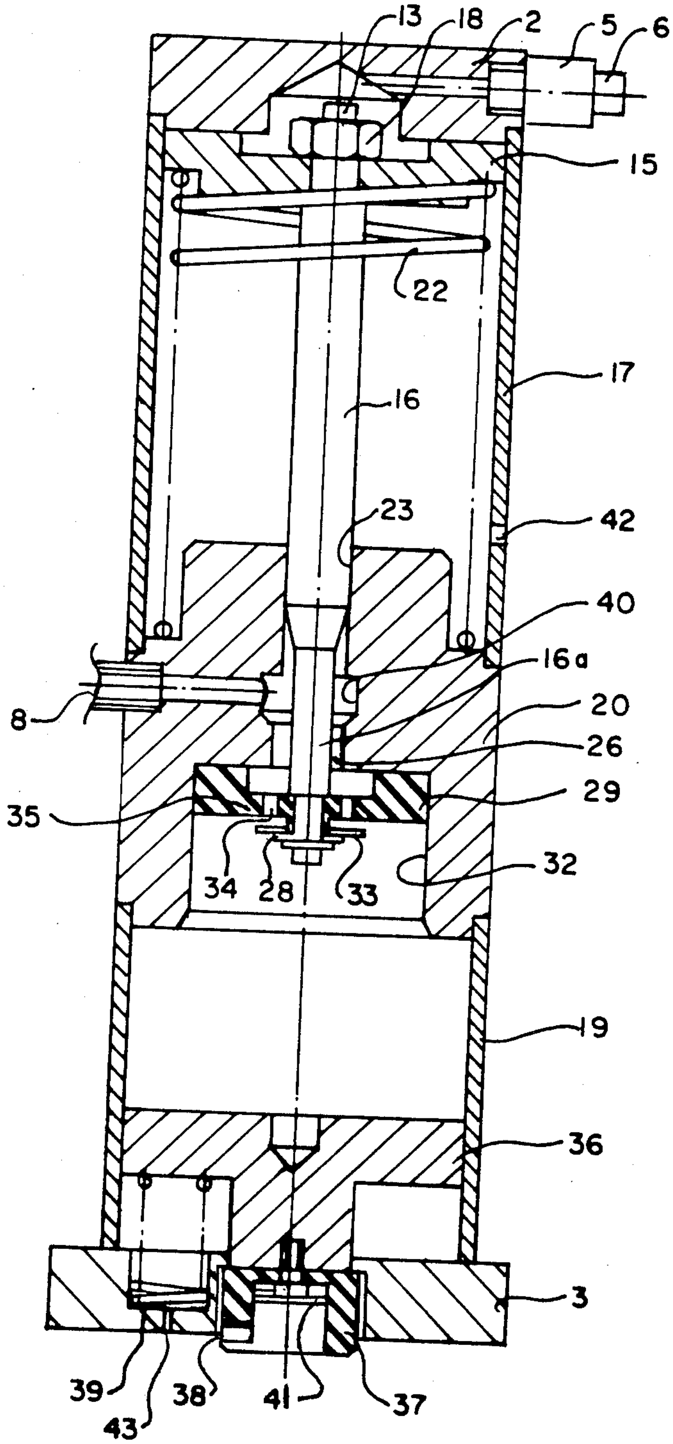

Referring now to FIG. 2, wherein similar parts are similarly designated, a modification of the invention is shown. In this instance parts not necessary for the understanding of the invention are not shown.

Piston 15, to which air pressure would normally be supplied during operation, moves downward under pressure in cylinder 17 and against pressure from return spring 22. Rod 16 to which piston 15 is secured by nut 14, is journalled in bore 23 of partition member 20 which performs essentially the same function as did partitions 20 and 21 of the embodiment shown in FIG. 1.

An enlarged portion 40 of bore 23 is connected to an oil sump, not shown, by means of connector 8. The lower portion of partition 20 is further enlarged at bore 32 to rod 16, which does not provide for oil flow-by as was the case in the embodiment of FIG. 1. Piston 29 is, however, provided with bleeder oil passages 34 which may be closed off by a flat washer like valve plate 33 slidably mounted on the end of shaft 16 by means of a snap washer 28 which also secures piston member 29. A further oil passage 35 of reduced size is located outside the area of contact of valve plate 33 with piston 29 and remains permanently open and in this embodiment provides the facility for oil flow-by similar to that provided by the loose fitting piston of the embodiment shown in FIG. 1.

In the lower cylinder 19 a movable close fitting piston 36 acts as an active punch ram member and has secured to a reduced cross-sectioned lower end thereof a punch holding means 37 secured by a bolt 41. A threaded part 38 is provided for set-screw locking of a punch in holding means 37. Means 37 also acts as a stop, against end member 3, to limit the upward movement of piston 36 under pressure of a return spring 39. The area above piston 36, including bore 40 is filled with oil.

In operation of the embodiment of the invention shown in FIG. 2 air pressure is applied to the upper surface of piston 15 which begins to move downward moving piston 29 downward in bore 32 creating pressure on the underside thereof which moves plate valve 33 upward to close oil passages 34. Oil passage 35 remains open and in view of the restricted flow provided thereby pressure builds up in cylinder 19 to move piston 36 down against the pressure of spring 39 until a punch secured in holder 37 contacts a workpiece. The pressure initially applied to the punch is greater than the applied air pressure by the ratio of the area of piston 15 to that of piston 29. This pressure is not sufficient to produce the punching apparatus and a delay, dependent on the flow of oil through passage 35 ensues, ending when the enlarged portion of shaft 16 enters the tight fitting lower bore 26 at which time the pressure rapidly increases to produce the necessary force for the punching operation. Air outlets 42, 43 are provided to prevent unnecessary back pressure build up against pistons 15 and 36.

On the release of air pressure springs 22 and 39 move pistons 15 and 36 upward and piston 36 rapidly reached its upper limit whereat valve plate 33 opens passages 34 to allow oil flow therethrough to shorten the time of return of piston 15 to its normal place of rest in FIG. 2.

It will now be apparent that the invention provides a two-step pressure system whereby rather rapid initial movement of a ram member can be achieved under lower pressure with the necessary higher pressure being supplied when needed for the final punching operation. The looseness of the piston 29 fit and/or the size of the oil passage 35 determines the time during which the first pressure step is active.

It will be obvious that various embodiments of the invention may occur to those skilled in the art and which do not depart from the spirit and scope thereof as set forth in the appended claims. For instance, the high pressure piston cylinder unit may be located between the first and second units or separated from the first unit by the second unit.

What I claim as new and desire to secure by Letters Patent of the United States is:

1. A two-step fluid pressure intensifier system comprising first, second and third operative piston and cylinder units arranged in coaxial alignment, the pistons of the first and second units being rigidly fixed to a common piston rod, the first piston having a greater effective working area than the second and the second piston having a greater effective working area than the third piston, a working fluid chamber located between the cylinders of the first and second units, through which the piston rod passes, the cylinder of the second unit being provided with a fluidic connection between it and the fluid chamber, the fluid chamber and the cylinder of the second unit containing a common working fluid, the piston rod being provided with a reduced cross-section portion between the pistons of the third and second units, the reduced cross-section portion residing within the fluidic connection when the piston rod is at the unactuated position of a working cycle, in order that there be fluidic communication between the chamber and the cylinder of the second unit, the third piston and cylinder unit being constituted by the unreduced cross-section portion of the piston rod and the fluidic connection, the third piston and cylinder unit only becoming operative as such at a predetermined position of the piston rod as it moves in the working stroke direction from the unactuated position, the second piston and cylinder arrangement being provided with limited working fluid flow-by during a working stroke to allow continued movement of the piston rod, in the working stroke direction, under impetus from a fluid pressure supplied to the first piston and cylinder unit to produce a working stroke cycle, and wherein a first increase in pressure of the working fluid in the cylinder of the second unit is produced by the initial movement of the piston of that unit and after movement of the piston rod a greater distance, in the working stroke direction, than said predetermined position, the pressure of the working fluid in the cylinder of the second unit is further increased and is primarily solely determined by the third piston and cylinder unit, means being provided to utilize the pressurized working fluid in the second unit.

2. The system as claimed in claim 1 wherein flow-by is provided by a loose fit between the piston and cylinder of the second unit.

3. The system as claimed in claim 2 wherein the flow-by is provided by a pressure bleeder hole through the piston of the second unit.

4. The system as claimed in claim 1 wherein the second piston and cylinder unit is provided with a pressure release valve which becomes operative during the return stroke of the working cycle.

* * * * *